United States Patent Office 3,524,719
Patented Aug. 18, 1970

3,524,719
SYNERGISTIC MIXTURES OF CERTAIN ORGANIC AMINES FOR RETARDING CORROSION IN AQUEOUS SYSTEMS
Paul A. Wolf and Francis J. Bobalek, Midland, Mich., assignors to The Dow Chemical Company, Midland, Mich., a corporation of Delaware
No Drawing. Filed May 13, 1968, Ser. No. 728,745
Int. Cl. C23f 11/12, 11/16, 14/02
U.S. Cl. 21—2.7          6 Claims

ABSTRACT OF THE DISCLOSURE

It has been found that compounds of the formula

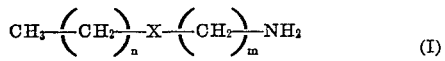  (I)

wherein $n=7$ to 13, $X=$—S— or —O— and $m=2$ or 3, or mixtures thereof, show unexpectedly good results as chemical corrosion inhibitors when combined with N,N''-(hexachlorobiphenylene)bis(ethylenediamine) or 1,1'-(hexachlorobiphenylene)bis(diethylenetriamine).

BACKGROUND OF THE INVENTION

Problems of chemical corrosion are widespread in situations where metals are in contact with aqueous systems, for instance cooling water, flooding water used in secondary oil recovery, and the like.

This corrosion can be inhibited by compounds such as those disclosed in our copending application, "The Use of Amines As Bactericides and Corrosion Inhibitors in Aqueous Systems," filed concurrently herewith, Ser. No. 728,746, these compounds being represented by Formula I below. Said application discloses the manner of making of said compounds, and the information of said application is incorporated herein by reference.

Chemical corrosion can also be inhibited by compounds such as N,N'' - (hexachlorobiphenylene)bis(ethylenediamine) and 1,1'-(hexachlorobiphenylene)bis(diethylenetriamine). These compounds, and their method of preparation, are taught in U.S. Pat. No. 3,164,634.

SUMMARY OF THE INVENTION

It has now been found that a compound of the formula

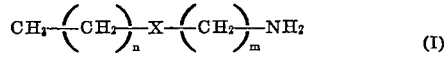  (I)

wherein $n=7$ to 13, $X=$—S— or —O— and $m=2$ or 3, or mixtures thereof, when combined with N,N''-(hexachlorobiphenylene)bis(ethylenediamine) or 1,1' - (hexachlorobiphenylene)bis(diethylenetriamine), give surprisingly better results than one would expect based on the corrosion inhibiting effect of each separately.

It is found that the mixtures most suitable are from about 5 to 95 percent by weight of the compounds of Formula I with about 95 to 5 percent by weight of the bis-amine compounds. Preferably about 30 to 60 percent by weight of (I) is combined with about 70 to 40 percent by weight of the bis-amines.

Any concentration of the mixture which is effective is suitable, usually a minimum concentration of about 10 p.p.m. of the aqueous media, and preferably around 20 p.p.m. being effective.

SPECIFIC EMBODIMENTS

Following are specific examples of the use of this invention.

The chemical corrosion test was performed on steel coupons (6 in. by 0.5 in.) made of shim steel of 0.005 in. thickness. The coupons were scrubbed slightly with detergent using a toothbrush. They were then rinsed, dried and weighed to the nearest milligram.

A brine solution was prepared by dissolving 5% by weight of sodium chloride and 0.25% of acetic acid in water. A standard household laundry washing machine was adapted to give a water bath (175° F.) in which bottled brine containing the coupons could be agitated.

The brine solution was flushed for 1 hour with nitrogen, and then $H_2S$ was bubbled through the brine 1 hour prior to use to simulate "sour" brines which occur quite widely in practice.

The test inhibitor in the proper amount was placed in the bottle, followed by 175 milliliters of the brine solution and the test coupon. The bottle was capped and placed in the water bath in the machine. The coupons were run in pairs, i.e., two coupons were each placed in bottles, one bottle containing the corrosion inhibiting component and brine solution, and one containing only brine solution. Each bottle was rotated in the water bath for 18 hours at 175° F. The bottles were then removed and inhibited HCl (5 to 10 percent) was added to remove FeS without attacking the base metal. The coupons were scrubbed, rinsed and weighed as previously.

The percent protection is calculated:

Percent protection $$=\frac{\text{wt. loss (blank)} - \text{wt. loss (coupon)}}{\text{wt. loss (blank)}} \times 100$$

It is to be noted that each table represents an entirely different series of expediments. In all cases 1,1'-(hexachlorobiphenylene)bis(diethylenetriamine) was the bis-amine used. The total concentration of inhibitor(s) was 20 p.p.m. based on the aqueous system.

The data are summarized below:

TABLE I

| Bis-amine, conc., p.p.m. | R—S—CH₂CH₂NH₂ | | Percent protection |
|---|---|---|---|
| | R | Conc., p.p.m. | |
| 20 | | | 30.0 |
| | n-C₈H₁₇ | 20 | 20.0 |
| | n-C₁₀H₂₁ | 20 | 42.3 |
| | n-C₁₂H₂₅ | 20 | 41.1 |
| | n-C₁₄H₂₉ | 20 | 25.1 |
| 18 | n-C₈H₁₇ | 2 | 36.1 |
| 18 | n-C₁₀H₂₁ | 2 | 41.1 |
| 18 | n-C₁₂H₂₅ | 2 | 55.3 |
| 18 | n-C₁₄H₂₉ | 2 | 48.5 |

TABLE II

| Bis-amine, conc., p.p.m. | R—S—CH₂CH₂NH₂ | | Percent protection |
|---|---|---|---|
| | R | Conc. p.p.m. | |
| 20 | | | 42.7 |
| | n-C₈H₁₇ | 20 | 20.1 |
| | n-C₁₀H₂₁ | 20 | 46.5 |
| | n-C₁₂H₂₅ | 20 | 41.6 |
| | n-C₁₄H₂₉ | 20 | 27.0 |
| 12 | n-C₈H₁₇ | 8 | 45.8 |
| 12 | n-C₁₀H₂₁ | 8 | 67.1 |
| 12 | n-C₁₂H₂₅ | 8 | 69.2 |
| 12 | n-C₁₄H₂₉ | 8 | 67.5 |

TABLE III

| Bis-amine, conc., p.p.m. | Conc. of C₁₂H₂₅—S—(CH₂)₃—NH₂ (p.p.m.) | Percent protection |
|---|---|---|
| 20 | | 42.2 |
| | 20 | 37.0 |
| 19 | 1 | 69.5 |
| 18 | 2 | 67.0 |
| 16 | 4 | 69.0 |
| 14 | 6 | 65.5 |
| 12 | 8 | 60.3 |
| 10 | 10 | 54.8 |
| 8 | 12 | 56.3 |
| 6 | 14 | 52.0 |
| 4 | 16 | 63.6 |
| 2 | 18 | 53.0 |
| 1 | 19 | 52.5 |

We claim:
1. The process of inhibiting metal corrosion in an aqueous medium which comprises maintaining in the aqueous medium an effective concentration of a mixture of
(a) one or mode compounds of the formula

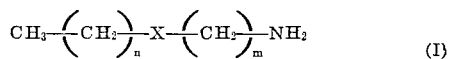
(I)

wherein $n=7$ to 13, $X=$—S— or —O— and $m=2$ or 3,
with
(b) one or both of N,N''-(hexachlorobiphenylene)bis-(ethylenediamine) and 1,1' - (hexachlorobiphenylene)bis(diethylenetriamine).

2. The process of claim 1 wherein the total concentration of the mixture is at least about 10 p.p.m. of the aqueous medium.

3. The process of claim 1 wherein the weight ratio of (a) to (b) is about 5/95 to 95/5.

4. The process of claim 3 wherein the weight ratio of (a) to (b) is about 30/70 to 60/40.

5. A metal corrosion inhibiting mixture for aqueous systems consisting essentially of
(a) one or more compounds of the formula

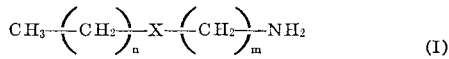
(I)

wherein $n=7$ to 13, $X=$—S— or —O— and $m=2$ or 3,
with
(b) one or both of N,N''-(hexachlorobiphenylene)bis-(ethylenediamine) and 1,1' - (hexachlorobiphenylene)bis(diethylenetriamine), wherein the weight ratio of (a) to (b) is about 5/95 to 95/5.

6. The mixture of claim 5 wherein (b) is 1,1'-(hexachlorobiphenylene)bis(diethylenetriamine).

References Cited

UNITED STATES PATENTS

| | | | |
|---|---|---|---|
| 2,818,365 | 12/1957 | Deebel | 424—325 XR |
| 3,164,634 | 1/1965 | Bremmer | 260—570.5 |
| 3,291,683 | 12/1966 | Lamb | 424—325 |
| 3,414,521 | 12/1968 | Teumac | 21—2.7 XR |

JOSEPH SCOVRONEK, Primary Examiner

D. G. MILLMAN, Assistant Examiner

U.S. Cl. X.R.

210—58, 59; 252—390, 391, 392